E. BOLTON.
Steam, Gas, and Water Regulators.

No. 155,699. Patented Oct. 6, 1874.

Attest:
Jas. H. Layman.
Henry Tanner.

Edward Bolton
By Knight Bros. Attys.

UNITED STATES PATENT OFFICE.

EDWARD BOLTON, OF CINCINNATI, OHIO.

IMPROVEMENT IN STEAM, GAS, AND WATER REGULATORS.

Specification forming part of Letters Patent No. 155,699, dated October 6, 1874; application filed August 27, 1874.

*To all whom it may concern:*

Be it known that I, EDWARD BOLTON, of Cincinnati, Hamilton county, Ohio, have invented a new and useful Steam, Gas, and Water Regulator, of which the following is a specification:

This is an improved form for those devices whereby any desired pressure is maintained in one vessel by the automatic opening and closing of communication with another vessel through the instrumentality of a yielding plate or diaphragm and a suitable valve.

Figure 1:
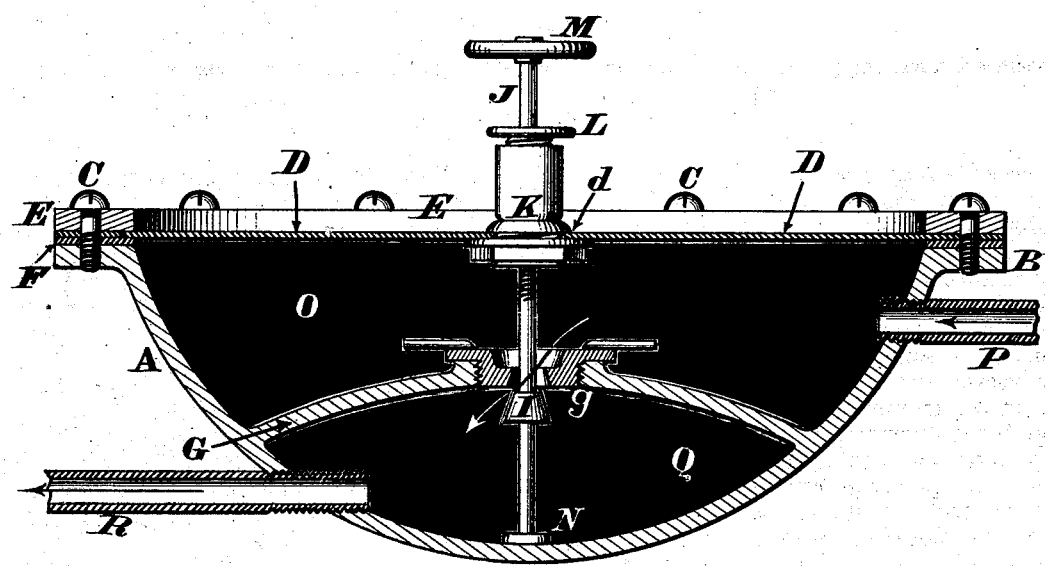
Figure 2:
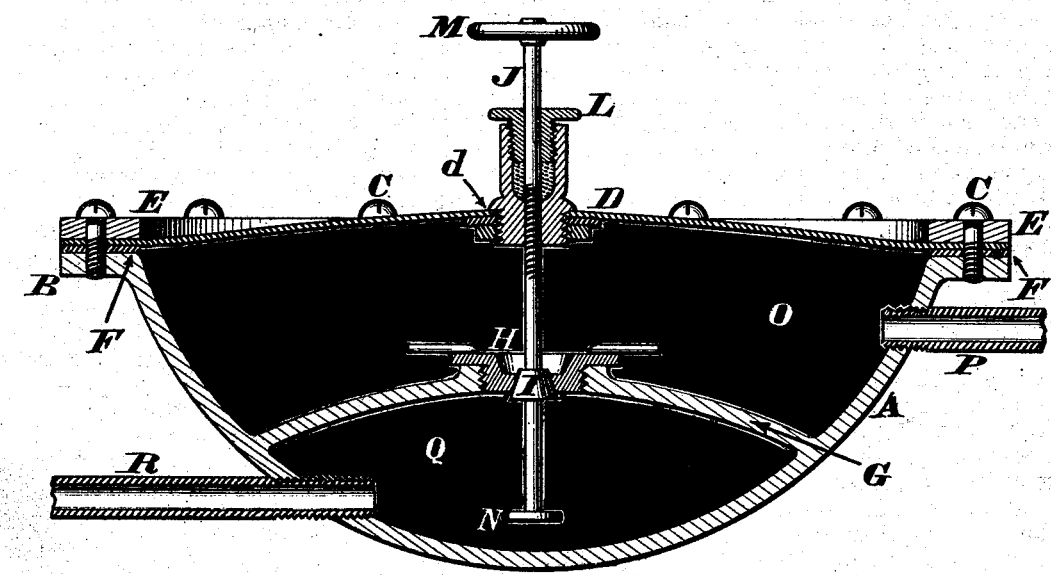

In the accompanying drawing, Figures 1 and 2 are axial sections of the same regulator in the open and closed conditions, respectively.

A represents my containing-shell, which may have the represented bowl shape, with marginal brim or flange B, perforated for bolts C, which attach yielding sheet or diaphragm D. E is a ring, and F a gasket, to enable the screwing down of the bolts to effect a perfectly tight joint between said shell and diaphragm. G is a partition in the shell A, having a central screw-threaded orifice, $g$, for valve-seat H of a puppet-valve, I, having a screw-threaded stem, J, which, being tapped into the lower portion K of a stuffing-box, L, that occupies central aperture $d$ of the diaphragm D, both enables the adjustment of said valve up or down, and holds it to the position adjusted. The stuffing-box L prevents leakage around the valve-stem J. M is a handle, to enable the rotation of said stem in the act of adjusting the valve. A foot, N, which projects from valve I, by arresting the valve, as shown in Fig. 1, enables its stem to support the diaphragm at its central point in the open condition of the valve, and, by so doing, to prevent the collapse of the diaphragm under circumstances of partial vacuum within the regulator. The partition G divides the shell A into two chambers or compartments, of which one chamber, O, communicates, by pipe P, with the steam or other generator, and the other chamber, Q, communicates, by means of pipe R, with the coil or other vessel to be supplied with a constant pressure of steam or other fluid.

The operation of my regulator is as follows:

So long as the temperature, and correlatively the pressure, of the passing steam is below the assigned limit, the diaphragm D remaining unaffected, or but slightly so, the valve I remains depressed and the passage open; or, should the temperature rise, the passage will be partially closed, and so remain until a reduction takes place.

If it be desired that the regulator shall close at a very low temperature, the valve I is elevated by rotating the screw-stem J; or if, on the other hand, it be desired that the passage remain open at a comparatively high temperature, then the valve is correspondingly lowered.

It will be seen that, should the diaphragm D become impaired or destroyed, it can be easily removed and repaired, or be replaced by a new one. It is also apparent that my valve I can be regulated from the outside without suspending the action of the instrument.

In some cases I may place the pipe R in communication with the generator, and the pipe P in communication with the coil or still, so as to make the pressure in the receiving-vessel the controlling agent.

I am aware that regulators have been proposed having flexible walls, of which one has been attached to a valve, and the other to a valve-seat, communicating with the steam-supply, and that such valve has been adjustable. I therefore disclaim such a device, broadly considered.

I claim as new and of my invention—

The combination of the two chambers O and Q, communicating with the generating and receiving vessels, respectively, yielding and separable diaphragm D, a valve, I, occupying a seat, H, in the dividing-wall G, and provided with a screw-stem, J, by which it is adjustable from without, and a stop or foot, N, the whole being arranged and operating as and for the purpose designated.

In testimony of which invention I hereunto set my hand.

EDWARD BOLTON.

Attest:
GEO. H. KNIGHT,
M. FRAGENDORF.